March 4, 1952  E. C. WEBB  2,588,064
KEYED SHAFT COUPLING
Filed Nov. 26, 1946
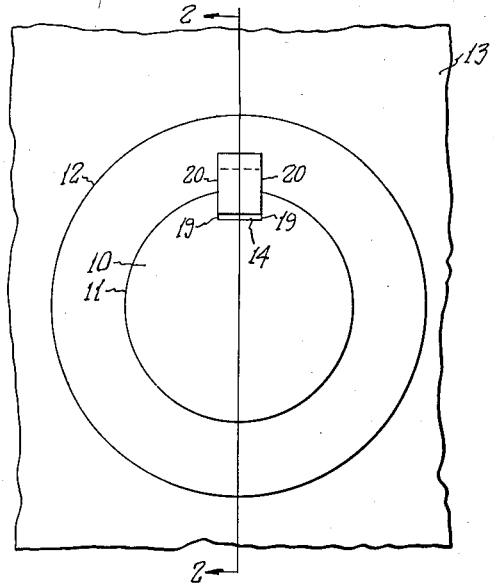
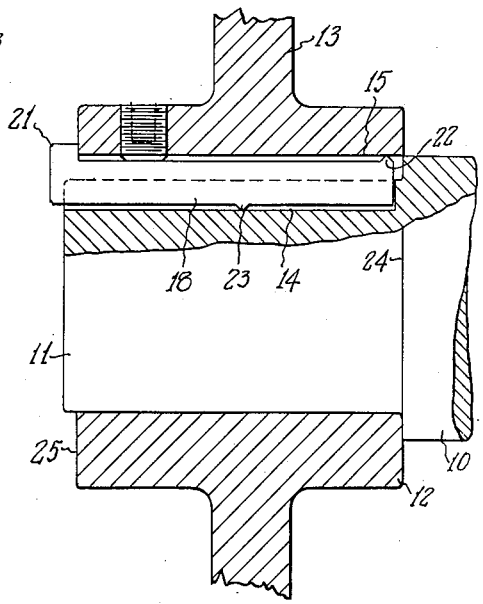
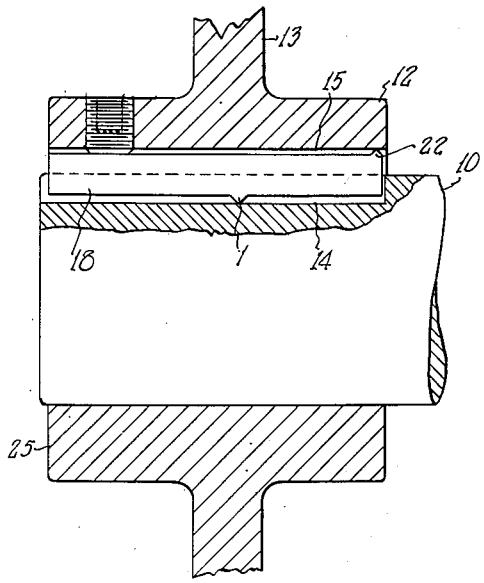
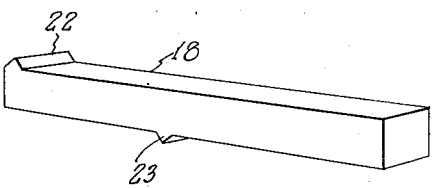
INVENTOR
E. C. WEBB
ATTORNEY

Patented Mar. 4, 1952

2,588,064

UNITED STATES PATENT OFFICE 2,588,064

KEYED SHAFT COUPLING

Ernest C. Webb, Bay Village, Ohio, assignor to Iron Fireman Manufacturing Company, Portland, Oreg.

Application November 26, 1946, Serial No. 712,285

6 Claims. (Cl. 287—52.05)

This invention relates generally to means for fastening a circular member to such as a shaft and particularly to a key for shafts and the like.

The main object of this invention is to provide a simple and efficient form of key for shafts which will not tend to become loose and escape from the connected parts.

The second object is to construct a key of the class described in which the key itself tends to resist relative movement of the parts.

I accomplish these and other objects in a manner set forth in the following specification as illustrated in the accompanying drawing, in which:

Fig. 1 is an end elevation of a shaft and a fragment of an object mounted thereon.

Fig. 2 is a vertical section taken along the line 2—2 in Fig. 1.

Fig. 3 is a view similar to Fig. 2 showing the use of a key without a gib.

Fig. 4 is a perspective view of a gibless key.

Similar numerals of reference refer to the same or similar parts throughout the several views.

Referring in detail to the drawing, there is shown a shaft 10 whose reduced portion 11 has mounted thereon the hub 12 of a wheel or other member 13.

The shaft portion 10 is provided with a keyway 14, and the hub 12 is provided with the keyway 15.

The hub 12 is also provided with a set screw 16, preferably of the hollow head type.

Referring particularly to my invention, the same will seem to reside principally in the key 18 which fits slidably between the sides 19 of the way 14 and sides 20 of the way 15 although being somewhat loose in a radial direction. The key 18 has formed on one end thereof a gib 21 such as are in common use. The opposite end of the key 18 has disposed thereon a sharp edge 22 which is turned in the same direction as the key 21. The opposite edge of the key 18 is provided with a sharp edge 23 approximately mid-way between the ends thereof and facing a direction opposite to the sharp edge 22.

In the form of the device shown in Fig. 2 wherein the parts are in place with the hub 12 against the shoulder 24 and the gib 21 is bearing against the face 25 of the hub 12, then any pressure exerted by the screw 16 will cause the sharp edge 22 to bite into the bottom of the way 15 and the sharp edge 23 to bite into the bottom of the way 14.

It must be understood that a spring material is employed in the construction of the key 18 so that any looseness occasioned by wear or vibration will be taken up by the spring action.

In the form of the device shown in Figs. 3 and 4, the purpose and operation are identical with that shown in the Figs. 1 and 2 except that without the gib it is necessary to rely entirely upon the holding action of the sharp edges 22 and 23. Obviously any form of set screw may be employed without departing from the spirit of this invention.

Attention is drawn to my co-pending application No. 607,795, now abandoned, over which the device described herein is an improvement.

While I have thus illustrated and described my invention, it is not my desire to be limited to the precise form shown herein, and I intend to cover such forms and modifications of the invention as fall fairly within the appended claims.

I claim:

1. A combination of a shaft having a keyway formed therein with an object mounted thereon and having a keyway formed therein adjacent to and in alinement with said keyway in said shaft and a key fitting freely between the sides of said keyways and loosely in a radial direction, said key consisting of a spring having a sharpened fulcrum edge between its ends resting in the bottom of the shaft portion of the keyway and having a second sharpened edge formed on the opposite edge of said key at one end thereof, said object having a screw therein bearing against the end of the key opposite said second sharpened edge.

2. A key system consisting of an elongated straight member of steel having a transverse elongated bearing edge across one side between its ends and having a second bearing edge extending laterally across one end of said member on the side opposite said first mentioned bearing edge, together with means for supporting said member in cantilever suspension on said bearing edges and means for applying a cantilever load to said member.

3. A key system for securing an object on a shaft consisting of an elongated bar of rectangular spring steel having a sharpened bearing edge projecting from the middle of one side and having a second sharpened bearing edge extending from the opposite edge at one end of said bar, together with means for supporting said bar in cantilever suspension on said bearing edges and means for applying a cantilever load to said bar.

4. A key system as described in claim 3, together with a gib formed on the same edge and on the same side as is said second sharpened edge.

5. In combination, a shaft having a keyway formed therein, a hub fitted to said shaft, said hub having formed therein a keyway adjacent to and in alignment with said keyway formed in said shaft, a key in both said keyways, and means adjustably positioned in said hub to bear on said key radially of said shaft, said key having three axially spaced radially facing bearing areas thereon, one of said three bearing areas being adapted to abut said adjustably positioned means, each of the other two of said bearing areas having bearing elements extending radially therefrom and at least one of said bearing elements extending radially inwardly toward the center of said shaft, whereby when said adjustably positioned means is adjusted to bear on said one of said bearing areas, said key will form a loaded beam having three areas of stress concentration, at least one of said areas being loaded by said shaft.

6. In combintion, a shaft having a keyway of rectangular transverse section formed therein, a hub fitted to said shaft, said hub having formed therein a keyway of rectangular section positioned in radial alignment with said keyway in said shaft, a key slidably fitted to the sides of both said keyways and fitted loosely radially in both said keyways, and means adjustably positioned in said hub to bear on said key radially of said shaft, said key having formed on its two radially spaced longitudinal sides three longitudinally spaced areas of bearing, each of two of said bearing areas having relatively sharp bearing elements raised thereon, the third of said bearing areas being located on the outer of said two radially spaced longitudinal sides of said key, two of said three bearing areas being formed on one of said radially spaced longitudinal sides of said key, the other of said three bearing areas being formed on the other of said radially spaced longitudinal sides of the said key, whereby when said adjustably positioned means is adjusted to bear on said third bearing area, said key will constitute a loaded beam having three areas of stress concentration, at least one of said areas of stress concentration being loaded by said shaft.

ERNEST C. WEBB.

REFERENCES CITED

The following references are of record in the file of this patent:

UNITED STATES PATENTS

| Number | Name | Date |
|---|---|---|
| 173,716 | Grawford | Feb. 22, 1876 |
| 1,075,523 | Vaterhaus | Oct. 14, 1913 |
| 1,387,172 | Postel | Aug. 9, 1921 |
| 1,772,008 | Kasper | Aug. 5, 1930 |

FOREIGN PATENTS

| Number | Country | Date |
|---|---|---|
| 175,990 | Great Britain | Nov. 9, 1922 |
| 191,817 | Great Britain | Jan. 17, 1923 |